United States Patent
Graves et al.

[11] Patent Number: 6,031,451
[45] Date of Patent: Feb. 29, 2000

[54] ELECTRICAL CIRCUITS FOR TURN SIGNAL, HAZARD SIGNAL AND BRAKE SIGNAL LIGHTS

[75] Inventors: Danny R. Graves, Springfield; Timothy W. Brooks, Cedar Hill, both of Tenn.

[73] Assignee: ACD Tridon Inc., Burlington, Canada

[21] Appl. No.: 09/030,897

[22] Filed: Feb. 26, 1998

[51] Int. Cl.[7] .................................................. B40Q 1/26
[52] U.S. Cl. ..................... 340/468; 340/458; 340/641; 340/642; 340/475; 340/479; 340/477; 307/10.8
[58] Field of Search ........................... 340/468 OR, 458, 340/641, 642, 475, 479, 477; 307/10.8

[56] References Cited

U.S. PATENT DOCUMENTS

| | | | |
|---|---|---|---|
| 4,812,808 | 3/1989 | Ulrich | 340/468 |
| 5,072,210 | 12/1991 | Kimmelman | 340/458 |
| 5,075,669 | 12/1991 | Nakadozono et al. | 340/458 |
| 5,614,884 | 3/1997 | Evans | 340/477 |
| 5,629,670 | 5/1997 | Pabla et al. | 340/479 |
| 5,770,999 | 7/1998 | Rhodes | 340/468 |
| 5,828,139 | 10/1998 | Slater | 307/10.8 |

*Primary Examiner*—Jeffery A. Hofsass
*Assistant Examiner*—Tai T. Nguyen
*Attorney, Agent, or Firm*—Robert F. Delbridge

[57] ABSTRACT

An electrical circuit for turn signal, hazard signal, and brake signal lights of an automotive vehicle has first and second relays each having an energizable coil and contacts which are in a first configuration when the coil is not energized and a second configuration when the coil is energized. A brake signal switch is operable to supply relative high steady electrical current to the first and second relay contacts, the contacts of the first relay when in the first configuration conducting the relative high steady electrical current to left rear light and the contacts of the second relay when in the first configuration conducting the relative high steady electrical current to a right rear light. The turn signal switch, when operated, also causes relative high electrical current to be supplied intermittently to the first and second relay contacts, the contacts of the first relay presenting an open circuit to the intermittent relative high current when in the first configuration and supplying the relative high intermittent current to a left front and the left rear lights, when in the second configuration to cause the left front and the left rear lights to be illuminated intermittently in a flashing manner, and the contacts of the second relay presenting an open circuit to the relatively high intermittent current when in the first configuration and supplying the relatively high intermittent current to a right front light and the right rear light, when in the second configuration to cause the right front and right rear lights to be illuminated in flashing manner. A hazard signal switch is operable to energize the coils of the first and second relays with relatively low steady electrical current to cause the contacts thereof to move to the second configuration, the hazard switch when operated also causing relatively high electrical current to be supplied intermittently to the first and second relay contacts to cause the left and right front lights and the left and right rear lights to be illuminated in a flashing manner.

7 Claims, 2 Drawing Sheets

ELECTRICAL CIRCUITS FOR TURN SIGNAL, HAZARD SIGNAL AND BRAKE SIGNAL LIGHTS

FIELD OF THE INVENTION

This invention relates to electrical circuits for turn signal, hazard signal and brake signal lights of automotive vehicles.

BACKGROUND OF THE INVENTION

Vehicle turn signals comprise flashing front and rear lights on the left or right hand side of the vehicle depending on the direction of the turn, a hazard signal comprises flashing front and rear lights on both the left and right hand sides of the vehicle, and a brake light signal comprises the steady illumination of the rear lights on both the left and right hand sides of the vehicle.

Many different electrical circuits have been used for this purpose. The standard practice has been to switch high current within the turn and hazard switches of the vehicle. This adds costs and lowers the reliability of the automobile wiring system. Attempts have been made to use low current switches in microprocessor based modules. Such modules are expensive, cause a delay in the brake signal (because the micro processor detects the signal and then operates the switch), and cannot utilize commercially available IC flasher units which are designed to compensate for incandescent bulb current over battery voltage.

It is therefore an object of the invention to provide a circuit which enables low current inputs to be used but does not require a microprocessor.

SUMMARY OF THE INVENTION

According to the invention, an electrical circuit for turn signal hazard signal and brake signal lights of an automotive vehicle has first and second relays each having an energizable coil and contacts which are in a first configuration when the coil is not energized and a second configuration when the coil is energized, a brake light signal operable to supply relatively high steady electrical current to the first and second relay contacts, the contacts of the first relay when in the first configuration conducting the relatively high steady electrical current to a left rear light and the contacts of the second relay when in the first configuration conducting the relatively high steady electrical current to a right rear light, whereby operation of the brake switch, when the coils of the first and second relay are not energized, cause the left and right rear brake lights to be illuminated in a steady manner.

A turn signal switch is operable to energize the coil of the first relay or the coil of the second relay by relatively low steady electrical current depending on the direction of turn to cause the contacts of the relay concerned to move to the second configuration, the turn signal switch when operated also causing relatively high electrical current to be supplied intermittently to the first and second relay contacts, the contacts of the first relay presenting an open circuit to the relatively high intermittent current when in the first configuration and supplying the relatively high intermittent current to a left front light and the left rear light when in the second configuration to cause the left front and rear lights to be illuminated intermittently in a flashing manner, and the contacts of the second relay presenting an open circuit to the relatively high intermittent current when in the first configuration and supplying the relatively high intermittent current to a right front light and the right rear light when in the second configuration to cause the right front and rear lights to be illuminated in a flashing manner.

A hazard signal switch is operable to energize the coils of the first and second relays with relatively low steady electrical current to cause the contacts thereof to move to the second configuration, the hazard switch when operated also causing relatively high electrical current to be supplied intermittently to the first and second relay contacts to cause the left and right front lights and the left and right rear lights to be illuminated in a flashing manner.

Thus, by use of a simple relay arrangement, operation of the turn signal switch will take priority over the operation of the brake light switch on the side of the vehicle concerned, and operation of the hazard signal switch will take priority over the operation of both the turn signal switch and the brake signal switch.

The electrical circuit may also include a flasher relay having an energizable coil and a contact operable by energization and de-energization of the flasher relay coil by relatively low steady electrical current or absence thereof respectively to cause said intermittent current to be supplied to the first and second relay contacts, and an IC flasher unit operable to effect said energization and de-energization of the flasher relay coil.

The electrical circuit may also include a flasher transistor switch in series with the flasher relay coil providing an open circuit therefor when neither the turn signal switch nor the hazard signal switch is actuated, the actuation of the turn signal switch or the hazard signal switch causing a signal to be sent to the base of the flasher transistor switch to cause the flasher transistor switch to become conducting and enable the flasher relay coil to be energized and de-energized by the IC flasher unit.

The IC flasher unit may have a ground connection in series with the flasher transistor switch whereby the ground connection of the IC flasher unit is broken when neither the turn signal switch nor the hazard signal switch is actuated, with current flow in the IC flasher unit thereby being discontinued.

BRIEF DESCRIPTION OF THE DRAWING

Embodiments of the invention will now be described, by way of example, with reference to the accompanying drawings, of which.

DESCRIPTION OF THE PREFERRED EMBODIMENTS

Figure 1:
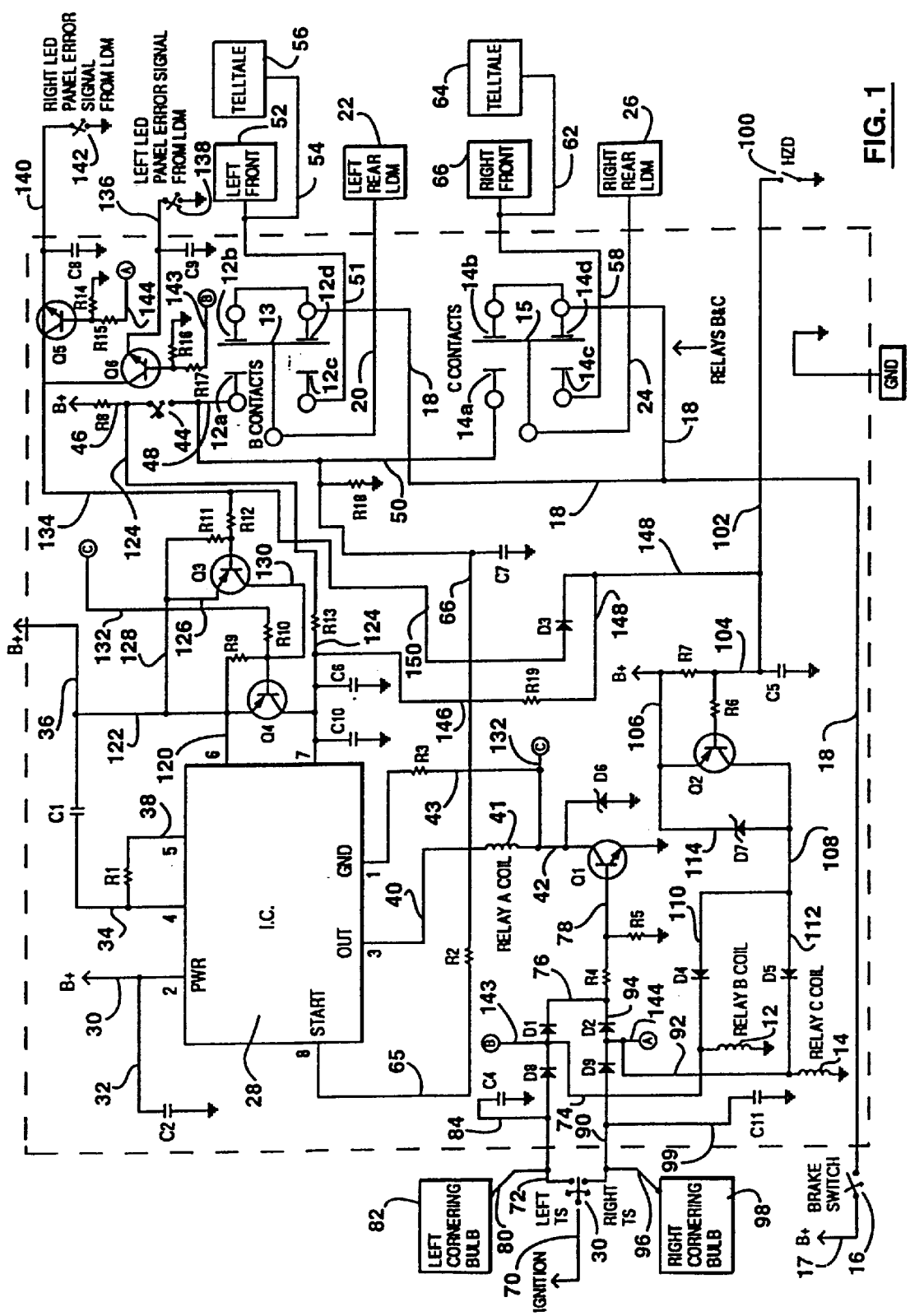
FIG. 1 shows an electrical circuit diagram for the turn signal, hazard signal and brake signal lights of an automobile, the circuit also including an error sensing function.

Referring to the drawing, FIG. 1 shows an electrical circuit diagram for the turn signal, hazard signal and brake signal lights of an automobile. A first relay has an energizable coil 12, contacts 12a, 12b, 12c and 12d and contact bridge 13 which are in a first configuration (shown in the drawing) when the coil 12 is not energized and a second configuration (to be described later) when the coil 12 is energized. A second relay has an energizable coil 14, contacts 14a, 14b, 14c and 14d and contact bridge 15 which are in a first configuration (shown in the drawing) when the coil 14 is not energized and a second configuration (to be described later) when the coil 14 is energized.

A brake signal switch 16 is operable to supply steady electrical current from line 17 connected to a battery terminal B+ through line 18 to the contacts 12d and 14d of the first and second relays. In the first contact configuration shown in the drawing, contacts 12b and 12d of the first relay are connected by relay contact bridge 13 through line 20 to a left rear light 22. Similarly, contacts 14b and 14d of the second relay are connected by relay contact bridge 15 through line 24 to right rear light 26. Thus, when the brake signal switch 16 is closed, and the coils 12 and 14 of the first and second relays are not energized so that their contacts are in the first configuration shown in the drawing, a steady current is supplied from the battery terminal B+ through the line 18 and the appropriate first and second relay contacts to the left and right rear brake lights 22, 26 to cause them to be illuminated in a steady manner.

A turn signal switch 30 is operable (in a manner which will be described in more detail later) to energize the coil 12 of the first relay or the coil 14 of the second relay, depending on the direction of the turn, to cause the contacts of the relay concerned to move to the second configuration. In the first relay, contacts 12b and 12d are disconnected from contact bridge 13 and contacts 12a and 12c are connected thereto by movement of contact bridge 13 from right to left in the drawing. Similarly, in the second relay, contact bridge 15 moves from right to left to disconnect contacts 14b and 14d therefrom and connect contacts 14a and 14c thereto.

The circuit also has a low current flasher IC 28, which in this embodiment is an SGS-Thomson L9686. The flasher IC 28 has a terminal 2 connected to battery terminal B+ by line 30 which is connected by line 32 and a capacitor C2 to ground. Terminal 4 of flasher IC 28 is connected by line 34 to capacitor C1 which is connected by line 36 to battery terminal B+. Terminal 5 of flasher IC 28 is connected by line 38 and resistor R1 to line 34. Terminal 3 of flasher IC 28 is connected by line 40 to flasher relay coil 41 which is connected by line 42 to the collector of a transistor Q1. The emitter of transistor Q1 is connected to ground and its base is connected to turn signal switch 30 in a manner which will be described in more detail later. Terminal 1 of flasher IC 28 is connected by line 43 and resistor R3 to line 42.

Flasher relay coil 41 has a contact 44 between a line 46 which is connected through resistor R8 to battery terminal B+ and a line 48 which is connected to contact 12a of the first relay. A line 50 also connects line 48 to contact 14a of the second relay. Contact 12c of the first relay is connected by line 51 to a left front light 52, and line 51 is also connected by line 54 to a corresponding telltale light 56. Similarly, contact 14c of the second relay is connected by line 58 to a right front light 60, and line 58 is also connected by line 62 to a corresponding telltale light 64. Terminal 8 of flasher IC 28 is connected by line 25 to resistor R2 which is connected by line 66 to line 50. Line 66 is also connected to ground by capacitor C7 and to ground by resistor R18.

A hazard signal switch 100 is connected between ground and a line 102 which is connected to ground by capacitor C5 and is connected by a line 104 through resistor R7 to battery terminal B+ and through resistor R6 to the base of a transistor Q2. The emitter of transistor Q2 is connected by line 106 to battery terminal B+. The collector of transistor Q2 is connected by line 108 and line 110 with diode D4 to the first relay coil 12, and is also connected by line 108 and line 112 with diode D5 to the second relay coil 14. Line 108 is also connected to line 106 by line 114 with diode D7.

The operation of the brake switch 16 to effect illumination of left and right rear lights 22, 26 in a steady manner has already been described. The operation of the turn signal switch 30 and the hazard switch 100 will now be described.

When turn signal switch 30 is actuated for a left turn, a line 70 from the ignition switch of the vehicle is thereby connected through line 72, diode D8 and line 74 to first relay coil 12. Line 74 is also connected through diode D1 and line 76 to resistor R4 which is connected by line 78 to the base of transistor Q1. Line 72 is also connected by line 80 to a left cornering bulb 82 and by line 84 and a capacitor C4 to ground. Similarly, when turn signal switch 30 is actuated for a right turn, line 70 is thereby connected through line 90, diode D9 and line 92 to second relay coil 14. Line 90 is also connected through diode D2 and line 94 to resistor R9 and hence through line 78 to the base of transistor Q1. Line 90 is also connected by line 96 to a right cornering bulb 98 and by line 99 and capacitor C11 to ground.

Thus, when the turn signal switch 30 is actuated for a left turn, line 70 from the ignition switch is connected through lines 72, 74 to first relay coil 12 thereby energizing the coil. As previously described, energization of first relay coil 12 causes movement of contact bridge 13 from right to left in the drawing to become disconnected from contacts 12b and 12d and connected to contacts 12a and 12c. Thus, line 48 from flasher contact 44 is now in communication through contact 12a, contact bridge 13, contact 12c and line 51 with left front light 52, and through contact 12a contract bridge 13 and line 20 with left rear light 22.

Besides energizing first relay coil 12, actuation of the turn signal switch 30 for a left turn also causes a voltage signal to be passed through line 76, resistor R4 and line 78 to the base of transistor Q1, thereby causing the transistor to conduct, with the result that current flows from terminal 3 of flasher IC 28 through flasher relay coil 41 and transistor Q1 to ground. At the same time, terminal 1 of flasher IC 28 is connected to ground through resistor R3, line 43 and transistor Q1 to ground. As a result, flasher contact 44 is closed, by energization of flasher relay coil 41, thereby causing current flow from battery terminal B+ through lines 46, 48, the contacts of the first relay as described in the preceding paragraph, and lines 51 and 20 to illuminate the left front and rear lights 52, 22.

The current passing through line 48 also causes a signal to be sent along lines 66, 65 to terminal 8 of IC flasher 28 to activate the circuitry therein and cause relay coil 41 to be energized intermittently by an oscillating voltage at terminal 3 with consequent flashing of the left front and rear lights 52, 22. Such operation of the flasher IC 28 will be readily apparent to a person skilled in the art.

It will also be noted that left cornering bulb 82 is illuminated in a steady manner, and that the left front telltale light 56 is illuminated in a flashing manner.

Operation of the turn signal switch 30 for a right turn causes energization of the second relay coil 14 with consequent movement of contact bridge 15 to connect contact bridge 15 to the right front and rear lights 66, 26. As with a left turn, a signal is applied to the base of transistor Q1 to cause energization of flasher relay coil 41 and subsequent flashing of the right front and rear lights 66, 26 and right front telltale light 64 and steady illumination of right cornering bulb 98.

Actuation of the hazard switch 100 applies a signal to the base of transistor Q2, causing the transistor to conduct, with the result that current flows from battery terminal B+ to transistor Q2 and lines 108, 110 to the left relay coil 12 and through lines 108, 112 to second relay coil 14. Thus, both first and second relay coils 12, 14 are energized, with resultant energization of flasher relay coil 41 and operation of flasher IC 28 as described above, with the result that the left and right, front and rear lights 52, 66, 22, 26 are operated in a flashing manner. Both telltale lights 56, 64 are also operated in a flashing manner.

It will be noted that terminal 1 of flasher IC 28 is connected to ground only when transistor Q1 conducts, i.e. only when turn signal switch 30 or hazard signal switch 100 is actuated. Thus, when no flashing light is required, i.e. when flasher IC 28 is in the quiescent mode, there is no ground path from the flasher IC 28, which consequently does not use any current. It will also be noted that the turn signal switch 30 and the hazard signal switch 100 are low current switches.

Also, the normal position of the contact bridges 13, 15 in the first and second relays, i.e. when neither the turn signal switch 30 nor the hazard signal switch 100 have been actuated, are in the brake light actuating mode and therefore do not provide a time delay in the activation of the brake lights. Further, if the turn signal switch 30 is actuated when the brake lights are on, the front and rear lights on the turn side will flash and the front and rear lights on the opposite side will remain steady. Similarly, if the hazard signal switch 100 is actuated when the brake lights are on and/or the turn signal switch 30 has been actuated, the front and rear left and right lights will flash.

The circuit also includes means to sense and respond to bulb outage and also to other error signals, and further includes means to disable such sensing and responding means if the hazard signal switch is actuated.

Terminal 6 of flasher IC 28 is connected through lines 120, 122 and 36 to battery terminal B+ and through line 120 to the emitter of transistor Q4. The collector of transistor Q4 is connected to line 124 which extends from between resistor R8 and flashing relay switch 44 to terminal 7 of flasher IC 28. Line 124 contains resistor R13 and is connected to ground through capacitor C6 and C10 which are in parallel with each other. A transistor Q3 has its emitter connected to battery terminal B+ through lines 126, 128, 122 and 36. The collector of transistor Q3 is connected by line 130 to the base of transistor Q4. The base of transistor Q3 is connected to its emitter through the resistor R11, and the base of transistor Q4 is connected to its emitter through resistor R9. The base of transistor Q4 is also connected through resistor R10 and line 132 to line 43 between resistor R3 and the collector of transistor Q1. For simplicity, the portion of line 132 between the two positions marked c has been emitted.

The base of transistor Q3 is connected through resistor R12 to a main error signal line 134 which extends from the collectors of transistors Q5 and Q6. A right hand error signal line 136 extends from ground through a LEFT panel error switch 138 to the emitter of transistor Q6, and a right hand error signal line 140 extends from ground through a right LED panel error switch 142 to the emitter of transistor Q5. Left error signal line 136 is connected to ground through capacitor C9, and right error signal line 140 is connected to ground through capacitor C8.

Line 74 (which is connected to first relay coil 12) is also connected through line 143 and resistor R17 to the base of transistor Q6, the base of transistor Q6 also being connected through resistor R16 to ground. For simplicity, the portion of line 143 between the two positions marked b have been emitted. Likewise, line 92 (which is connected to second relay coil 14) is also connected through line 144 and resistor R15 to the base of resistor Q5, the base of transistor Q5 also being connected through resistor R14 to ground. Again, for simplicity, a portion of line 144 between the two positions marked (A) has been emitted.

Terminal 7 of flasher IC 28 is also connected through lines 124, 146, resistor R19 and line 148 to line 102 which extends through hazard switch 100 to the base of transistor Q2. Main error signal line 134 is also connected through line 150 and diode D3 to hazard switch line 102 via portion of line 148.

If any of the bulbs of left front and left rear lights 52, 22 or right front and right rear lights 60, 26 is broken when the turn signal switch 30 is actuated for a left or right turn respectively, the current through resistor R8 (when flashing relay switch 44 is closed) will be lower than normal. Therefore, the voltage drop across resistor R8 will also be lower than normal. The voltage drop across resistor R8 is sensed by the flasher IC 28 as the voltage drop across terminals 6 and 7 thereof. It will be noted that terminal 6 is connected to battery terminal B+ as also is one side of resistor R8, and that terminal 7 is connected through line 124 to the other side of resistor R8.

Such a bulb failure will cause the voltage across resistor R8 and hence across terminals 6 and 7 of flasher IC 28 to decrease to a pre-determined voltage, for example 85 mV, at which voltage (or lower voltage) the flasher IC 28 is set to double the flasher frequency, i.e. be in an outage mode, thereby providing a visual indication of bulb failure. The value of resistor R8 can be adjusted to set the point at which the outage mode is initiated.

As regards errors sensed by left and right error switches 138, 142, which are closed during normal (error-free) operation, signals in front and right error signal lines 136, 140 are only transmitted to main signal error line 134 if transistor Q6 or transistor Q5 respectively is enabled. When no left or right hand turn signal has been selected by turn switch 30, lines 142 and 144 connected to the bases of transistors Q6, Q5, respectively are grounded through line 74 and first relay coil 12 and through line 92 and second relay coil 14 respectively, thereby disabling the transistors Q6 and Q5 respectively.

If turn signal switch 30 is actuated for a left turn, a signal occurs on line 142 and hence at the base of transistor Q6, thereby enabling transistor Q6. Thus, any signal on left error signal line 136 is then transmitted by transistor Q6 to main error signal line 134. Similarly, if turn signal switch 30 is actuated for a right turn, a signal appears on line 144 and hence at the base of transistor Q5, thereby enabling transistor Q5. Thus, any signal on right error signal line 140 is then transmitted by transistor Q5 to the main error signal line 134.

If there is no left or right LED panel error, left and right error signal switches 138, 142 are closed, thereby grounding the emitters of transistors Q6, Q5 respectively. It will be noted that the base of transistor Q3 is normally grounded through line 150, diode D3 lines 148, 102 and capacitor C5. Thus, operation of turn signal switch 30 will not cause any change in this respect, because left and right signal lines 136, 140 are grounded, and enabling of transistor Q6 or Q5 does not change the grounded state of main error signal line 134 for the base of transistor Q3. The transistor Q3 is enabled when its base is grounded, as the result of which transistor Q4 is disabled.

If there is a problem with a left or right rear load, the left or right error switch 138 or 142 will open, thereby producing an open circuit to the emitter of transistor Q6 or Q5 respectively. When turn signal switch or right turn sign a left or right turn signal, the resultant enabling of transistor Q6 or Q5 causes an open circuit to appear at the base of transistor Q3, thereby disabling transistor Q3 with resultant enabling of transistor Q4. It will be noted that resistor R10 is connected to line 132. Enabling transistor Q4 causes the voltage across terminals 6 and 7 of flasher IC 28 to be reduced to the saturation voltage of transistor Q4, it being arranged that the saturation voltage is below the predetermined voltage, such as 85 mV required by the flasher IC 28 to induce the previously described voltage mode.

It is necessary that the above described outage mode of the flasher IC 28 be disabled when the hazard signal switch 100 is actuated. Thus, when hazard signal switch 100 is closed, lines 102, 148 resistor R19 and lines 146, 142 are grounded, thereby grounding terminal 7 of flasher IC 28. This maintains the voltage dropped across terminals 6 and 7 of flasher IC 28 above the pre-determined value, such as 85 mV, required to keep the flasher IC 28 in the normal flash mode. Also, closure of the hazard signal 100 grounds resistor R12 through lines 100, 148, diode D3 and line 150, thereby preventing left and right error switches 138, 142 from initiating an outage mode.

The function of various components of the circuit not specifically described, such as various resistors, capacitors and diodes, will also be readily apparent to a person skilled in the art. For example, the decoupling capacitors are included to minimize the effects of EMI.

Figure 2:
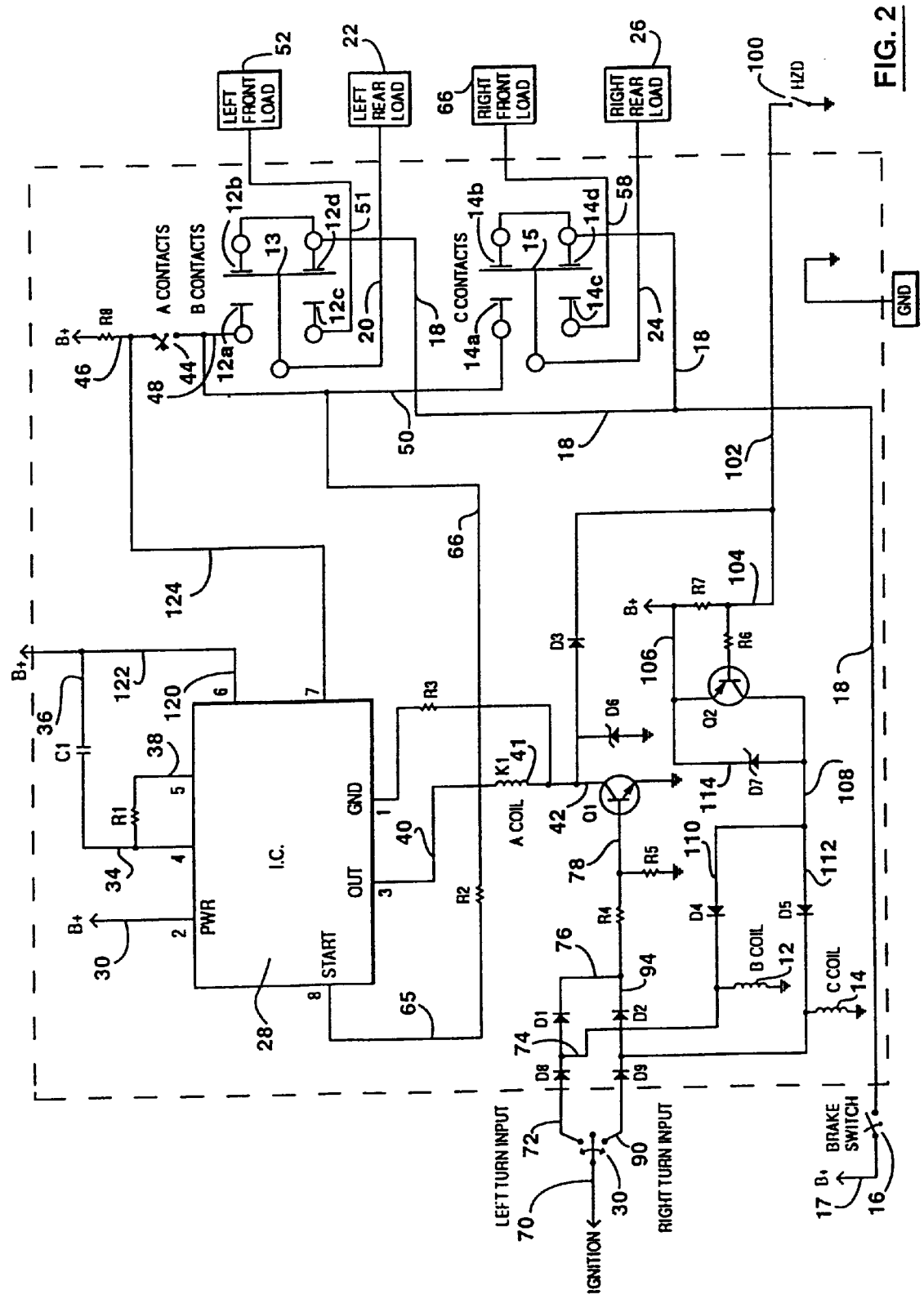
FIG. 2 shows a similar circuit diagram to FIG. 1, but without the error sensing function, the capacitors having been omitted for clarity.

FIG. 2 shows a similar circuit diagram to FIG. 1, but without the error sensing function and with the capacitors omitted for clarity. Also for clarity, the same reference numerals have been used to identify the components shown in FIG. 2 which are also shown in FIG. 1. It is therefore believed that further description of the circuit of FIG. 2 is unnecessary. Some minor changes have been made, the nature of which will be readily apparent to a person skilled in the art from the comparison of FIGS. 1 and 2. It should however be mentioned that, in this embodiment, the low current flasher IC 28 is a Telefuken U6438.

Other embodiments of the invention will be readily apparent to a person skilled in the art, the scope of the invention being defined in the appended claims.

We claim:

1. An electrical circuit for turn signal, hazard signal and brake signal lights of an automotive vehicle, said electrical circuit having:

first and second relays each having an energizable coil and contacts which are in a first configuration when the coil is not energized and a second configuration when the coil is energized, a brake signal switch operable to supply relatively high steady electrical current to the first and second relay contacts, the contacts of the first relay when in the first configuration conducting the relatively high steady electrical current to a left rear light and the contacts of the second relay when in the first configuration conducting the relatively high steady electrical current to a right rear light, whereby operation of the brake switch, when the coils of the first and second relays are not energized, cause the left and right rear brake lights to be illuminated in a steady manner, a turn signal switch operable to energize the coil of the first relay or the coil of the second relay by relatively low steady electrical current depending on the direction of turn to cause the contacts of the relay concerned to move to the second configuration, said turn signal switch when operated also causing relatively high electrical current to be supplied intermittently to the first and second relay contacts, the contacts of the first relay presenting an open circuit to the intermittent relatively high current when in the first configuration and supplying the relatively high intermittent current to a left front light and the left rear light when in the second configuration to cause the left front and rear lights to be illuminated intermittently in a flashing manner, and the contacts of the second relay presenting an open circuit to the relatively high intermittent current when in the first configuration and supplying the relatively high intermittent current to a right front light and the right rear light when in the second configuration to cause the right front and rear lights to be illuminated in a flashing manner, and a hazard signal switch operable to energize the coils of the first and second relays with relatively low steady electrical current to cause the contacts thereof to move to the second configuration, the hazard switch when operated also causing relatively high electrical current to be supplied intermittently to the first and second relay contacts to cause the left and right front lights and the left and right rear lights to be illuminated in a flashing manner.

2. An electrical circuit according to claim 1 also including a flasher relay having an energizable coil and a contact operable by energization and de-energization of the flasher relay coil by relatively low steady electrical current or absence thereof respectively to cause said relatively high intermittent current to be supplied to the first and second relay contacts, and an IC flasher unit operable to effect said energization and de-energization of the flasher relay coil.

3. An electrical circuit according to claim 2 including a flasher transistor switch in series with the flasher relay coil providing an open circuit therefor when neither the turn signal switch nor the hazard signal switch is actuated, the actuation of the turn signal switch or the hazard signal switch causing a signal to be sent to the base of the flasher transistor switch to cause the flasher transistor switch to become conducting and enable the flasher relay coil to be energized and de-energized by the IC flasher unit.

4. An electrical circuit according to claim 3 wherein the IC flasher unit has a ground connection in series with the flasher transistor switch whereby the ground connection of the IC flasher unit is broken when neither the turn signal switch nor the hazard signal switch is actuated, with current flow in the IC flasher unit thereby being discontinued.

5. An electrical circuit accordingly to claim 2 including a voltage sensing device for sensing voltage change caused by failure of any one of the front and rear lights, when selected for flashing operation, said voltage sensing device causing the IC flasher unit to effect flashing of another light selected for flashing operation at a frequency different from normal.

6. An electrical circuit according to claim 2 including a left error sensing device and a right error sensing device for sensing an error in the left or right load (?) respectively, said left or right sensing device being operable, when a left or right light respectively has been selected for flashing operation, to cause the IC flasher unit to effect flashing at a frequency different from normal.

7. An electrical circuit according to claim 6 including a means for disabling operation of the left and right error sensing devices when the hazard switch is operated.

* * * * *